United States Patent [19]

Blalock, Jr.

[11] Patent Number: 4,785,766

[45] Date of Patent: Nov. 22, 1988

[54] AVIAN CARRIER APPARATUS

[76] Inventor: Robert R. Blalock, Jr., 4550 - 4th Place North, Salem, Oreg. 97303

[21] Appl. No.: 74,211

[22] Filed: Jul. 16, 1987

[51] Int. Cl.⁴ .............................................. A01K 31/00
[52] U.S. Cl. ..................................................... 119/17
[58] Field of Search ......................... 119/17, 19, 23, 26

[56] References Cited

U.S. PATENT DOCUMENTS

| | | | |
|---|---|---|---|
| 2,219,297 | 10/1940 | Copeman | 119/23 |
| 3,195,507 | 7/1965 | Miller | 119/23 |
| 3,785,343 | 1/1974 | Baratta | 119/17 |
| 3,834,352 | 9/1974 | Gervis | 119/17 |
| 4,104,986 | 8/1978 | Dunigan | 119/17 |

FOREIGN PATENT DOCUMENTS 2035034  6/1980  United Kingdom .................. 119/19

Primary Examiner—Robert Peshock
Attorney, Agent, or Firm—Henderson & Sturm

[57] ABSTRACT

A portable avian carrier apparatus (10) comprising an apertured generally rectangular housing member (13) having an angled rear panel (17) and provided with an interior (30) and exterior (40) perch element; wherein the exterior perch element also serves as a handle (40) for the apparatus (10); and a clear apertured closure member (60) operatively associated with the housing member (13) to define the interior chamber (100) of the apparatus (10).

7 Claims, 1 Drawing Sheet

AVIAN CARRIER APPARATUS

TECHNICAL FIELD

The present invention relates generally to the field of domestic pet carriers, and more specifically to a carrier for birds.

BACKGROUND ART

While the prior art is replete with myriad and diverse portable bird confinement devices that may be used to transport a bird from one location to another, as can be seen by reference to the following U.S. Pat. Nos: 3,785,343; 4,104,986; 3,195,507; and 3,834,352, very few of the known prior art devices outside of the '352 reference have been specifically developed to serve as a portable temporary avian carrier.

As can be seen by reference to the aforementioned patented structures, while most bird cages possess a degree of portability, their size and relatively flimsy construction do not lend these devices to widespread usage as a portable and safe transport apparatus for birds.

Admittedly, the Gervis construction (U.S. Pat. No. 3,834,352) was developed specifically to produce a portable avian carrier apparatus; and, while this construction is more than adequate to serve its basic role and function, there are potentially serious structural shortcomings incorporated into this particular design.

Briefly stated, the perceived problems associated with the Gervis construction involve the lack of structural rigidity and strength in the open mesh wire cage framework employed on the upper portion of the device; as well as the narrow configuration of the lower portion of the device which would seem to unduly restrict and confine the movements of a bird placed within this apparatus.

In the former instance, potential physical harm can befall the bird should a heavy object collapse the open mesh top of the device and, in the latter instance, the bird may be subjected to unnecessary stress due to the restrictive configuration of this particular apparatus.

Obviously, there exists ample room for improvement over the aforementioned prior art constructions and the primary goal in the development of the present invention was to produce an avian carrier apparatus that was specifically designed with the birds safety and comfort as primary considerations.

DISCLOSURE OF THE INVENTION

The avian carrier apparatus that forms the basis of the present invention comprises in general a specifically configured rigid housing unit having an internal and external perch element wherein the external perch element doubles as a carrier handle for the apparatus. In addition, the housing unit is further provided with a movable receptacle that may optionally be positioned beneath a selected one of the plurality of perch elements.

The housing unit is further fabricated from apertured rigid planar elements wherein the apertures insure that fresh air will freely circulate within the apparatus. In addition, the planar elements are assembled in such a manner as to produce a housing unit configuration that not only complements and conforms to a bird's anatomy but which also reduces the likelihood that all of the breathing vent apertures could be obstructed even if the apparatus were totally surrounded by other objects such as luggage, crates, packages or the like.

The carrier apparatus also includes a clear apertured closure unit that is operatively associated with the front of the housing unit wherein the closure unit is adapted to be lockably secured to the housing unit to insure that unauthorized individuals cannot gain access to the bird.

Briefly stated, the avian carrier apparatus of this invention provides a rugged, inexpensive, lightweight, safe and secure means of transporting birds from one location to another which is far superior to any functionally similar constructions that have been developed to date.

BRIEF DESCRIPTION OF THE DRAWINGS

These and other objects, advantages and novel features of the invention will become apparent from the detailed description of the best mode for carrying out the preferred embodiment of this invention which follows, particularly when considered in conjunction with the accompanying drawings, wherein.

BEST MODE FOR CARRYING OUT THE INVENTION

Figure 1:
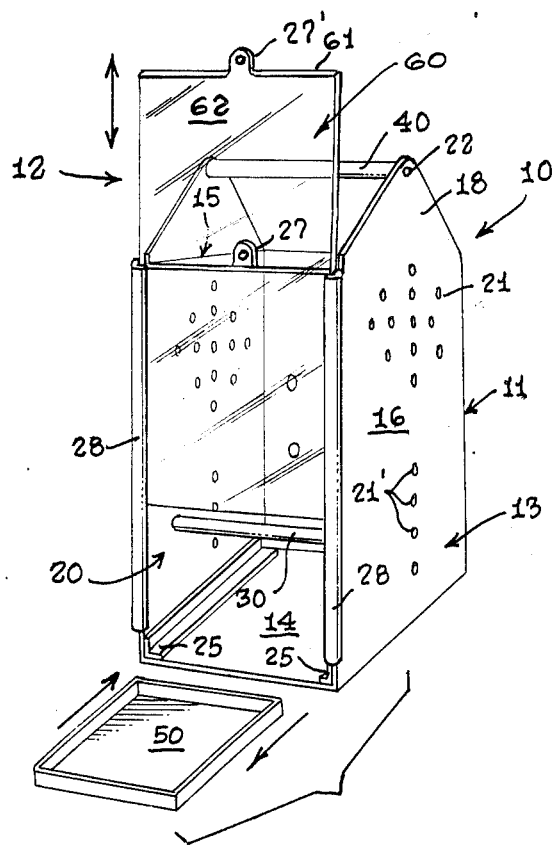
FIG. 1 is a perspective view of the avian carrier apparatus.

As can be seen by reference to the drawings and in particular to FIG. 1, the avian carrier apparatus that forms the basis of the present invention is designated generally by the reference numeral (10). The carrier apparatus (10) comprises in general a housing unit (11) and a closure unit (12). These units will now be described in seriatim fashion.

As clearly depicted in FIGS. 1 through 5, the housing unit (11) comprises a generally rectangular rigid, integral, apertured housing member (13) which includes a generally rectangular panel floor (14), a generally rectangular roof panel (15), a pair of elongated contoured side panels (16), and a rear panel (17).

Figure 2:
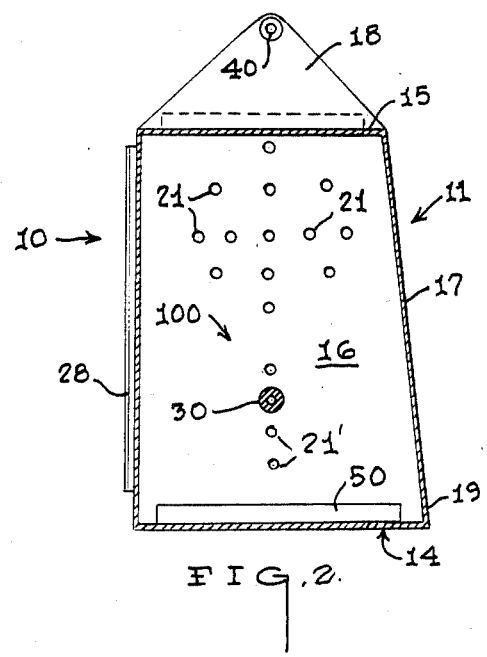
FIG. 2 is a cross-sectional side view of the apparatus.

As can best be appreciated by reference to FIGS. 1 and 2, the side panels (16) of the housing member (13) are provided with a generally triangular extension portion (18) formed on their upper ends wherein the extension portions (18) originate at and terminate a substantial distance above the roof panel (15) of the housing member.

In addition, the roof panel (15) is shorter in length than the floor panel (14) whereby, the trailing edges (19) of the side panels (16) will project outwardly and downwardly relative to the roof panel (14) such that, the rear panel (17) will be angled relative to the open face (20) of the housing member (13).

Figure 3:
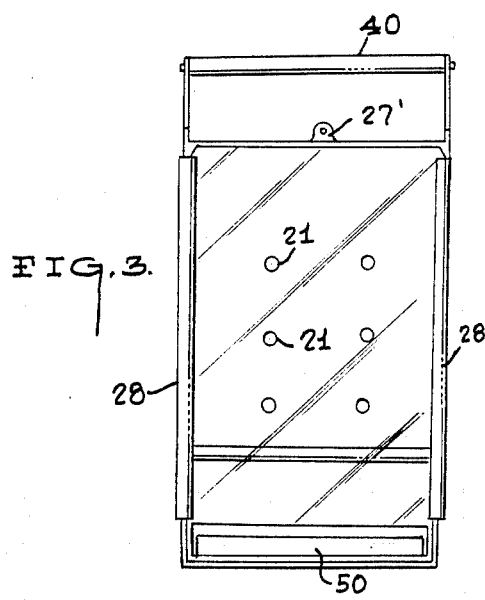
FIG. 3 is a front plan view of the apparatus.
Figure 5:
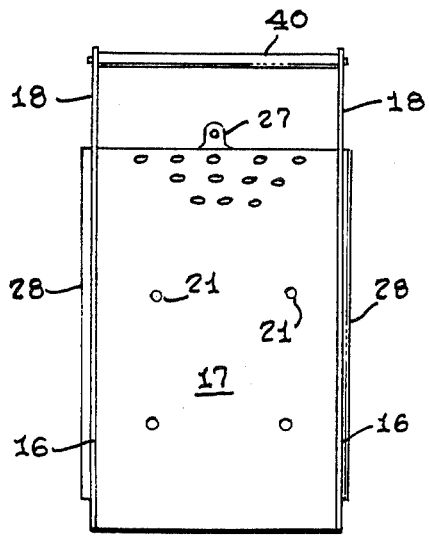
FIG. 5 is a rear plan view of the apparatus.
Figure 4:
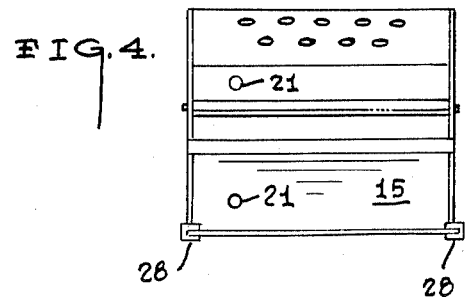
FIG. 4 is a top plan view of the apparatus.

As shown in FIGS. 1 through 3, the housing unit (11) further comprises a plurality of perch members (30 and 40), and a movable tray member (50) that may be deployed on the interior or the exterior of the apparatus (10).

Again referring to FIGS. 1 and 2, it can be appreciated that the side panels (16) are provided with a plurality of spaced breathing hole apertures (21) in the lower portion of the housing member (13) wherein, selected pair of opposed and vertically aligned apertures (21') are adapted to releasably receive one of the plurality of perch members (30) whereby, the interior perch member (30) may be vertically adjusted relative to the side panels (16) to vary the height of the perch member (30) within the housing member (13).

In addition, the triangular extension portions (18) of the side panels (16) are provided with a pair of opposed apertures (22) that also receive the ends of the other exterior perch member (40) wherein the exterior perch member (40) is spaced from the roof panel and serves a primary function as the carrying handle of the apparatus (10).

As can best be seen by reference to FIGS. 1 and 3, the housing member (13) further comprises a pair of opposed generally L-shaped rail elements (25) that are disposed along the juncture of the side panels (16) with the floor panel (14), an apertured lock receiving tang (27) formed on and projecting upwardly from the front of the roof panel (15), and a pair of vertically disposed, opposed elongated channel elements (28) formed on the leading edges of the side panels (16) and adapted to slidingly receive the closure unit (12) of the apparatus.

As best shown in FIGS. 1 and 3, the closure unit (12) comprises a generally elongated rectangular closure member (60) fabricated from a sheet of clear, rigid, shatterproof material (62) such as lucite or the like, wherein, the closure member (60) is dimensioned to be slidingly received within the channel elements (28) of the housing member (13).

In addition, the closure member (60) is further provided with an apertured lock receiving tang (27') that is formed on, and projects upwardly from, the top edge (61) of the closure member (60), whereby a conventional lock (not shown) may be inserted through the complementary tangs (27 and 27') of the housing unit (11) and closure unit (12) to secure a bird within the apparatus (10).

Turning now to FIGS. 1 and 2, it can be seen that in normal usage the tray member (50) is intended to be slidably received on the rail elements (25) contained within the housing member (13); however, in instances wherein the handle member (40) is employed as an exterior perch (40), the tray member (50) may also be deployed on top of the roof panel (15) to serve its normal function.

As shown in FIGS. 1 through 5, all of the planar surfaces that define the interior chamber (100) of the apparatus (10) are intended to contain a plurality of spaced breathing apertures (21), whereby an uninterrupted flow of fresh air will be maintained within the interior of the apparatus. In addition, the slanted disposition of the rear panel (17) of the housing member (13) coupled with the elevated disposition of the exterior perch (40) relative to the top panel (15) virtually precludes the possibility that all, or even the vast majority, of the breathing apertures (21) could become obstructed by other objects placed around and on top of the apparatus.

It should also be noted at this juncture that the angled disposition of the rear panel (17) accommodates the natural profile of a bird's tail feathers, while the clear closure unit (12) diminishes the bird's sense of confinement within the apparatus (10). In addition, the rugged construction of the apparatus (10) represents a substantial increase in the safety margin afforded by the flimsier prior art constructions.

Having thereby described the subject matter of this invention, it should be apparent that many substitutions, modifications and variations of the present invention are possible in light of the above teachings. It is therefore to be understood that the invention as taught and described herein is only to be limited to the extent of the breadth and scope of the appended claims.

I claim:

1. A portable avian carrier apparatus comprising:
   a housing unit including a generally rectangular, rigid integral, apertured housing member having a generally rectangular floor panel, a generally rectangular roof panel, a pair of elongated side panels, and a rear panel; wherein the roof panel is shorter in length than said floor panel and the rear panel extends downwardly and outwardly relative to said roof panel;
   a pair of perch members associated with the housing member and comprising an interior perch member and an exterior perch member wherein the exterior perch member forms a carrying handle for the apparatus;
   a closure unit comprising an elongated rectangular closure member operatively associated with the housing member to define an interior chamber within the apparatus wherein the closure member comprises: an elongated sheet of rigid material having an apertured lock receiving tang formed on the top edge of the closure member; and,
   a tray member selectively disposed on said floor panel or said roof panel.

2. The avian carrier apparatus as in claim 1 wherein the roof panel of the housing member is provided with an apertured lock receiving tang that is formed on the forward edge of the roof panel.

3. The avian carrier apparatus as in claim 2 wherein the side panels are provided with elongated, opposed, vertically disposed, channel elements that slidably receive the closure member.

4. The avian carrier apparatus as in claim 3 wherein the side panels are further provided with extension portions that project above the said roof panel.

5. The avian carrier apparatus as in claim 4 wherein the exterior perch member is operatively secured to the extension portions of the side panels, whereby the exterior perch member is spaced from the roof panel to serve as a handle for the apparatus.

6. The avian carrier apparatus as in claim 1 wherein the apertured housing members is provided with a plurality of spaced breathing apertures that communicate with the interior chamber of the apparatus.

7. The avian carrier apparatus as in claim 1 wherein the closure member is provided with a plurality of spaced breathing apertures that communicate with the interior chamber of the apparatus.

* * * * *